US005770129A

United States Patent [19]
Monti

[11] Patent Number: 5,770,129
[45] Date of Patent: Jun. 23, 1998

[54] APPARATUS AND METHOD FOR CONTROLLING MASS FLOW IN AN EXTRUSION DIE

[75] Inventor: Brian James Monti, Alpharetta, Ga.

[73] Assignee: Honeywell Measurex Devron, Inc., Canada

[21] Appl. No.: 576,950

[22] Filed: Dec. 22, 1995

[51] Int. Cl.$^6$ ................................................ B29C 47/92
[52] U.S. Cl. ...................... 264/40.1; 264/40.5; 264/40.4; 425/141; 425/466
[58] Field of Search .................................. 264/40.1, 40.5, 264/40.6, 40.7, 40.4; 425/140, 141, 466, 382.4

[56] References Cited

U.S. PATENT DOCUMENTS

| | | | |
|---|---|---|---|
| 3,940,221 | 2/1976 | Nissel | 425/141 |
| 4,302,172 | 11/1981 | Hogseth et al. | 425/141 |
| 4,439,125 | 3/1984 | Dieckmann et al. | 264/40.4 |
| 4,514,348 | 4/1985 | Iguchi et al. | 264/40.1 |
| 4,517,055 | 5/1985 | Dove | 162/344 |
| 4,594,063 | 6/1986 | Reifenhäuser et al. | 425/141 |
| 4,692,213 | 9/1987 | Dove | 162/259 |
| 4,770,744 | 9/1988 | Dove | 162/259 |
| 4,833,941 | 5/1989 | Leppanen et al. | 74/625 |
| 4,854,844 | 8/1989 | Carlsen | 264/40.1 |
| 4,965,736 | 10/1990 | Balakrishnan | 364/469 |
| 4,990,079 | 2/1991 | Lorenz | 425/466 |
| 5,066,435 | 11/1991 | Lorenz et al. | 425/141 |
| 5,096,542 | 3/1992 | Dove | 162/259 |
| 5,273,420 | 12/1993 | Gross et al. | 425/466 |

FOREIGN PATENT DOCUMENTS

| | | | |
|---|---|---|---|
| 2631099 | 1/1978 | Germany | 425/466 |
| 3-53922 | 3/1991 | Japan | 264/40.1 |

Primary Examiner—Mathieu D. Vargot
Attorney, Agent, or Firm—Limbach & Limbach L.L.P

[57] ABSTRACT

An apparatus and method for controlling mass flow in an extrusion die provides cross-directional measurements of at least one property of an extrusion produced by the extrusion die, such measurements being made at a plurality of cross-directional locations that successively span the extrusion. The measurements are assembled to provide cross-directional profiles of the extrusion. A spatial-frequency splitter operates upon the cross directional profiles to separate selected spatial frequency component profiles from each cross-directional profile. A reference profile is provided for representing desired spatial frequency profiles. An error signal generator generates error signals representing the difference between the spatial frequency component profiles and the desired spatial frequency profiles and actuators control mass flow components of the extrusion die in response to the error signals.

29 Claims, 6 Drawing Sheets

APPARATUS AND METHOD FOR CONTROLLING MASS FLOW IN AN EXTRUSION DIE

BACKGROUND OF THE INVENTION

This invention relates to an apparatus and method for controlling mass flow of a molten polymer in an extrusion die to obtain a desired extrusion profile in an extrusion produced by such extrusion die.

Extrusion dies typically have upper and lower die blocks between which a molten polymer is forced to produce an extrusion. One or the other of these die blocks may be fitted with a restrictor bar operable to extend into the space between the die blocks to more evenly distribute the melt or mass of molten polymer. In addition, at least one of the die blocks will include a die lip which acts as the final stage of the die for producing the final profile of the extrusion. Depending upon the flow characteristics of the molten polymer and the thickness or profile of the extrusion desired, the restrictor bar and die lip must be adjusted to produce the desired profile.

The prior art indicates that adjustments to the restrictor bar and die lip have been made in various ways. For example U.S. Pat. No. 4,514,348 to Iguchi et al discloses a plurality of bolts threadedly engaged with the die lip, each bolt being individually tensionable to deflect a corresponding portion of the die lip a few thousands of an inch. Mechanical adjustment of the bolts is used for a relatively coarse adjustment of the die lip and is performed while the die is in operation, by a positionable bolt rotating device controlled by a control apparatus. The control apparatus monitors the profile of the extrusion and moves the bolt rotating device as required to tighten or loosen selected bolts to correspondingly adjust the die lip and the profile of the extrusion. An alternative embodiment employs heat to take advantage of the bolts' coefficients of heat expansion to cause the bolts to expand or contract to effect adjustment of the lip opening.

Generally, there are a variety of methods to obtain automatic lip actuation, including thermal bolts, electric motors and piezo electric bolts. Thermal bolts appear to be the most widely used and accepted method of automatic die control. Thermal bolts require heaters and suitable power supplies to operate the heaters. The use of heat to extend or retract bolts requires that the die be warmed up before use, perhaps one-half hour to one hour. Due to the thermal masses of the die lips such a machine is not able to permit fast profile adjustments during production of the extrusion. Rather, it may take many minutes before the desired profile is acquired. If there are changes in temperature of the melt or other properties which affect flow, it may be another few minutes before the desired profile is reached. In critical applications, this may result in excessive wastage of material and can be time consuming. In addition, if, after extruding one polymer, the user desires to extrude another polymer, the user may have to wait until the die cools before making coarse mechanical adjustments to suit the new polymer and then must wait several minutes for the die to warm up and then wait a further few minutes before the die reaches the desired profile. And, again, the extrusion is subject to changes in flow conditions affecting the profile, which may take many minutes to correct.

What would be desirable therefore is an extruder which would allow fast start-up of extruder processes and preset control for fast start-up when extruding different polymers. In addition accurate, fast control of the extrusion profile would be desirable. The present invention addresses these needs.

SUMMARY OF THE INVENTION

In accordance with one aspect of the invention, there is provided an apparatus for controlling mass flow in an extrusion die, including measurement means for providing cross-directional measurements of at least one property of an extrusion produced by the extrusion die, such measurements being made at a plurality of cross-directional locations that successively span the extrusion, means for assembling the measurements to provide cross-directional profiles of the extrusion, spatial-frequency splitting means for operating upon the cross directional profiles to separate selected spatial frequency component profiles from each cross-directional profile, reference profile means for providing reference profiles representing desired spatial frequency profiles, error signal generating means for generating error signals representing the differences between the spatial frequency component profiles and the desired spatial frequency profiles and actuators for controlling mass flow components of the extrusion die in response to the error signals to minimize the differences between said spatial frequency component profiles and said reference profiles.

The spatial frequency component profiles include high and low frequency component profiles respectively and the reference profile means includes high and low frequency reference component profiles respectively. The error signal generating means produces high and low frequency error signals respectively.

Preferably, the actuators include first and second sets of actuators connected to the mass flow components, the first set of actuators being controlled by the low frequency error signals and the second set of actuators being controlled by the high frequency error signals.

Preferably, the first set of actuators is disposed generally linearly in the cross direction, with each actuator of the first set being spaced apart from an adjacent actuator of the first set by a first distance. Also preferably, the second set of actuators is disposed linearly in the cross-direction, and parallel and spaced apart from the first set of actuators, each actuator of the second set being spaced apart from an adjacent actuator of the second set by a second distance, the first distance being greater than the second distance.

Preferably, the mass flow components include a flexible restrictor bar extending in the cross-direction for interfering with the mass to control the flow thereof, the flexible restrictor bar having a plurality of cross-directional portions, the first set of actuators being connected to respective cross directional portions of the restrictor bar such that each actuator is operable to move a corresponding cross-directional portion of the restrictor bar.

Preferably, the mass flow components also include a flexible die lip extending in the cross-direction and having a plurality of cross-directional portions for acting on the mass to control the flow thereof, each of the actuators of the second set of actuators being connected to a respective cross-directional portion such that each of the actuators of the second set is operable to move a respective cross-directional portion of the die lip.

Preferably, the error signal generating means includes high and low frequency comparators for comparing the high and low frequency component profiles with the high and low frequency reference profiles to produce high and low frequency error profiles respectively.

Preferably, the error signal generating means includes means for controlling pressure in the mass, the means for controlling pressure including a pressure sensor operable to produce a measured pressure value representing the pressure of the mass within the die, means for providing a reference pressure value corresponding to the extrusion properties of the mass being extruded and pressure comparison means for determining the difference between the measured pressure value and the reference pressure value and for globally increasing or decreasing at least one of the high and low frequency error profiles in response to the difference to produce a pressure adjusted error profile.

Preferably, the error signal generating means includes first and second signal generators for producing the high and low frequency error signals in response to the pressure adjusted error profile and at least one of the high and low frequency error profiles.

Preferably, the pressure comparison means increases or decreases the low frequency error profile.

It is preferable that, each actuator of the first and second sets of actuators has position feedback means for providing an indication of the position of the actuator.

Preferably, the first and second signal generators have initialization means for automatically setting each of the actuators of the first and second sets of actuators into an initialization position defined by the high and low frequency reference component profiles and the reference pressure value corresponding to the type of material to be extruded.

Preferably, the first set of actuators is controlled by the low frequency error signals and preferably, the second set of actuators is controlled by the high frequency error signals.

Preferably, the spatial frequency splitting means represents the spatial frequency components as low and high frequency component profiles respectively, the low and high frequency profiles each including a respective list of numbers representing amplitudes of the spatial frequency components at respective cross-directional locations along the cross-directional profile.

Preferably, the apparatus includes low and high frequency profile processors for producing low and high frequency mapped profiles as a function of at least one of the numbers of the low and high frequency components respectively.

Preferably, each of the actuators has a respective zone in the cross-direction and preferably, the measurement means takes a plurality of measurements within each zone.

Preferably, the function for producing the mapped profile is an averaging function for averaging numbers representing the low and high frequency components associated with locations within a zone of a respective actuator.

Preferably, the comparing means compares numbers in successive locations in the low and high frequency mapped profiles with numbers in corresponding positions in the low and high frequency reference profiles respectively to produce low and high frequency error profiles, the low and high frequency error profiles including lists of numbers representing the differences between corresponding numbers in the low frequency component profile and the low frequency reference profile and the differences between corresponding numbers in the high frequency component profile and the high frequency reference profile, the error signals being derived from the high and low frequency error profiles.

In accordance with another aspect of the invention, there is provided an apparatus for controlling mass flow in an extrusion die, the apparatus including:

a) cross-directional measurement means for providing cross-directional measurements of at least one property of an extrusion produced by the extrusion die, such measurements being made at a plurality of cross-directional locations that successively span the extrusion;

b) means for assembling the measurements to provide cross-directional profiles of the extrusion;

c) spatial-frequency splitting means for operating upon the cross directional profiles to separate selected spatial frequency component profiles from each cross-directional profile;

d) pressure measurement means for producing a measured pressure of the mass in the die;

e) reference profile means for providing reference profiles representing desired spatial frequency profiles and for representing a desired pressure of mass in the die for a given type of mass;

f) error signal generating means for generating error signals representing the difference between the spatial frequency component profiles and the desired spatial frequency profiles and the difference between the measured pressure and the desired pressure; and g) first and second sets of actuators for controlling mass flow components of the extrusion die in response to the error signals to minimize the differences between the spatial frequency component profiles and the desired spatial frequency profiles and the difference between the measured pressure and the desired pressure;

In accordance with another aspect of the invention, there is provided a method of controlling mass flow in an extrusion die, the method comprising the steps of:

a) providing cross-directional measurements of at least one property of an extrusion produced by the extrusion die, such measurements being made at a plurality of cross-directional locations that successively span the extrusion;

b) assembling the measurements to provide cross-directional profiles of the extrusion;

c) operating upon the cross directional profiles to separate selected spatial frequency component profiles from each cross-directional profile;

d) providing reference profiles representing desired spatial frequency profiles;

e) for generating error signals representing the difference between the spatial frequency component profiles and the desired spatial frequency profiles; and f) controlling mass flow components of the extrusion die in response to the error signals to minimize the differences between said spatial frequency component profiles and said reference profiles.

In accordance with another aspect of the invention, there is provided a method of controlling mass flow in an extrusion die, the method comprising the steps of:

a) providing cross-directional measurements of at least one property of an extrusion produced by the extrusion die, such measurements being made at a plurality of cross-directional locations that successively span the extrusion;

b) assembling the measurements to provide cross-directional profiles of the extrusion;

c) operating upon the cross directional profiles to separate selected spatial frequency component profiles from each cross-directional profile;

d) measuring the pressure of the mass in the die;

e) providing reference profiles representing desired spatial frequency profiles and for representing a desired pressure of mass in the die for a given type of mass;

f) generating error signals representing the difference between the spatial frequency component profiles and the desired spatial frequency profiles and the difference between the measured pressure and the desired pressure;

g) controlling mass flow components of the extrusion die in response to the error signals to minimize the differences between the spatial frequency component profiles and the desired spatial frequency profiles and the difference between the measured pressure and the desired pressure;

h) providing an indication of the position of the actuators; and i) automatically setting each of the actuators of the first and second sets of actuators into an initialization position defined by the references profiles corresponding to the type of material to be extruded.

BRIEF DESCRIPTION OF THE DRAWINGS

In drawings which illustrate embodiments of the invention.

DETAILED DESCRIPTION

Figure 1:
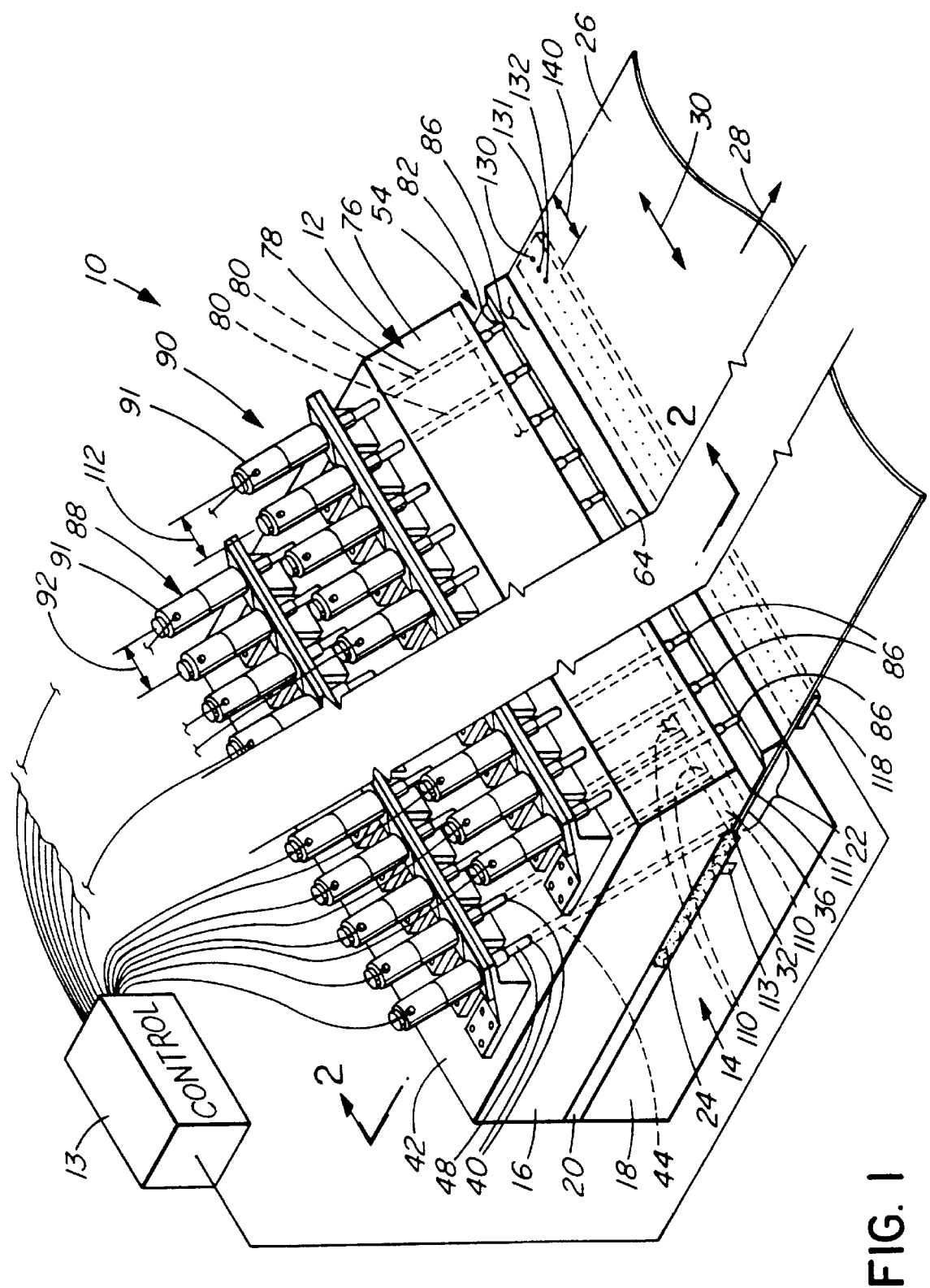
FIG. 1 is a fragmented perspective view of an apparatus according to a first embodiment of the invention.

Referring to FIG. 1, an extrusion system according to a first embodiment of the invention is shown generally at 10. The extrusion system includes an extrusion die 12 and an apparatus 13 for controlling mass flow in the extrusion die.

Die block

The extrusion die 12 has a die block 14 having spaced apart upper and lower portions 16 and 18. The upper and lower portions are formed to define a flow channel 20 and a manifold portion 22. In use, a mass of molten polymer 24 is forced into the flow channel 20 and exits the die through the manifold portion 22 as an extrusion 26. The molten mass 24 thus has a flow direction indicated by arrow 28. A cross-direction is indicated by arrow 30 and is defined along the length of the die block 14 in a direction generally at right angles to the flow direction 28.

Restrictor Bar

Figure 2:
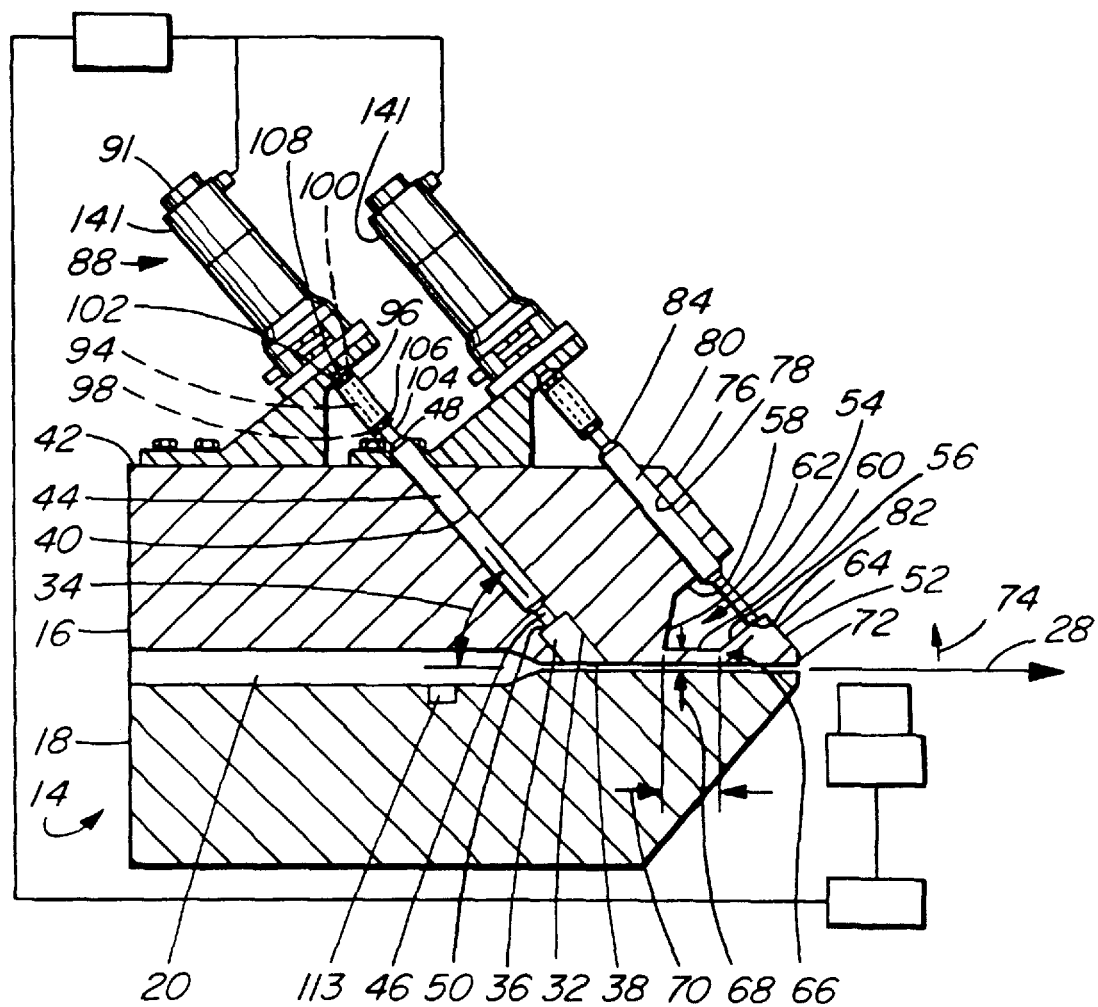
FIG. 2 is a cross-sectional view of the apparatus of FIG. 1 taken along lines 2—2.

Referring to FIG. 2, the upper die block portion 16 has an angled restrictor bar slot 32 formed therein, which extends into the upper die block at an angle 34 to the flow direction 28 and which extends lengthwise in the cross-direction (as seen best in FIG. 1). In the restrictor bar slot 32 is received a stainless steel restrictor bar 36 having a generally rectangular parallelepiped shape with an angled surface 38 which is generally parallel to the flow direction when the apparatus is in use. In this embodiment, the restrictor bar 36 is formed from Stainless 316 stainless steel.

Referring to FIG. 1, a first plurality of bores 40 is formed in spaced apart relation in the upper die block portion 16, each bore 40 extending between a top surface 42 of the upper die block portion 16 and the restrictor bar slot 32. In this embodiment, the bores are arranged linearly in the cross-direction on approximately 6-inch centres. Referring back to FIG. 2, spindles, one of which is shown at 44 are received in respective bores. Each spindle 44 has first and second end portions 46 and 48, the first end portions 46 being threadedly engaged with respective cross-directional portions 50 of the restrictor bar 36 and the second end portions 48 extending out of the top surface 42 of the upper die block portion 16.

Die lip

Still referring to FIG. 2, the upper portion 16 of the die block 14 has an angled end portion 52 in which is formed a geometrically shaped slot 54 having first and second parallel side surface portions 56 and 58 and first and second converging end surface portions 60 and 62. The slot 54 is formed such that a generally triangular die lip 64 is formed at an outer extremity of the upper die portion 16 and such that the die lip 64 is connected to the remainder of the upper die portion by a relatively thin rectangular portion 66. The thickness 68 and length 70 of the rectangular portion 66 are designed such that the rectangular portion 66 is resiliently flexible such that an outer extremity 72 of the die lip is operable to be moved up and down in the direction of arrow 74, from the parallel, natural orientation shown in solid outline, to a fully flexed orientation shown in broken outline. It will be appreciated that the stress and strain coefficients of the type of material used in forming the upper die block portion 16 will determine the length 70 and thickness 68 of the rectangular portion 66. In the embodiment shown, the die is formed from Stainless 316 stainless steel and the rectangular portion 66 has a length of 5–20 mm and has a thickness of 5–12 mm.

Referring back to FIG. 1, near an end surface 76 of the upper die block portion 16, a second plurality of bores 78 is formed on 3-inch centres in the cross-direction 30, in this embodiment. Each bore 78 extends at an angle to the flow direction, between the geometrically shaped slot 54 and the top surface 42 of the die block portion 16. A second plurality of spindles 80 is received in the second plurality of bores, with each spindle 80 being received in a respective bore 78. Referring back to FIG. 2, each of the second spindles 80 has a first and second end portion 82 and 84. Referring back to FIG. 1, the first end portions 82 are threadedly engaged with respective cross-directional portions 86 of the die lip 64, while the second end portions 84 extend above the top surface 42 of the upper die portion 16.

Actuators

Referring to FIG. 1, the upper die block portion 16 has first and second sets 88 and 90 of linear actuators 91 mounted thereto in linear spaced apart relation, each set extending in the cross-direction 30. Each actuator of the first set 88 is spaced apart from an adjacent actuator of the first set 88 by a first distance 92 which, in this embodiment, is 6 inches such that each actuator of the first set 88 is operable to connect to a respective second end portion 48 of a respective spindle 44.

Referring to FIG. 2, the actuators 91 of the first set of actuators 88 are connected to respective second end portions 48 by respective axially adjustable connectors 94, which, in this embodiment, include bushings 96 having oppositely disposed, axially aligned left and right-hand threaded portions 98 and 100. The actuators 91 and respective second end portions 48 have respective threaded portions 102 and 104 which cooperate with respective threaded bushings 96. First and second lock nuts 106 and 108 are disposed on respective actuators 91 and second end portions 48 and are used in the conventional manner to lock the bushings 96 to their respective actuators 91 and second end portions 48.

Referring to FIG. 1, the first set of actuators 88 is thus connected to the restrictor bar 36 via the first set of spindles 44 and is operable to cause respective portions 110 of the restrictor bar 36 to be extended or retracted from the manifold portion 22, thereby varying the degree of interference respective cross-directional portions 110 of the restrictor bar 36 present to the flow of mass of molten polymer 24 in the manifold portion 22. More generally, it may be said that the die includes a flexible restrictor bar 36 extending in the cross-direction for interfering with the mass to control the flow thereof, the first set of actuators being connected to respective cross-directional portions 110 of the restrictor bar 36 to move the respective cross-directional portions into and out of the manifold portion 22. Each of the actuators of the first set has a respective area of influence 111 on the extrusion, whereby movements of a given actuator cause changes in thickness or weight of the extrusion within this area.

Aside from the flow restricting aspects of the restrictor bar, the interference provided by the respective cross-directional portions 110 also has an overall effect upon the pressure of the molten mass in the manifold portion 22 before it reaches the die lip. Thus, the restrictor bar 36 also acts as means for varying the pressure of the molten mass in the manifold portion 22. The restrictor bar 36 can therefore be positioned to present a predetermined degree of interference to set a desired working pressure corresponding to the type of material being extruded. A pressure sensor 113 is provided on the die block 14 to measure the pressure of the molten mass in the melt zone immediately preceding the restrictor bar in the flow of molten mass.

Still referring to FIG. 1, the second set of actuators 90 is also disposed linearly in the cross-direction 30, and parallel and spaced apart from the first set of actuators 88. Each actuator 90 of the second set is spaced apart from an adjacent actuator of the second set by a second distance 112, which, in this embodiment is 3 inches, such that each actuator 90 of the second set is operable to connect to a respective second end portion 84 of a respective spindle 80 of the second set. The actuators 91 of the second set of actuators 90 are connected to respective spindles 80 in the same manner as the first set of actuators 88 is connected to its respective set of spindles 44, ie. using bushings.

The second set of actuators 90 is thus operable to cause respective cross-directional portions 86 of the die lip 64 to be extended or retracted from the manifold portion 22, thereby varying the size and shape of the opening through which the extrusion 26 exits the die. More generally, it may be said that the die 12 includes a flexible die lip 64 extending in the cross-direction 30 for acting on the mass of molten polymer 24 to control the flow thereof, the second set of actuators 90 being connected to respective portions of the die lip 64 via the spindles 80 to move respective cross-directional portions 86 of the die lip 64 to vary the shape of the opening through which the extrusion 26 exits the die 12. Each of the actuators 91 of the second set 90 has a respective area of influence 140 on the extrusion 26, whereby movements of a given actuator 91 cause changes in thickness or weight or at least one property of the extrusion within this area.

The actuators of both the first and second sets 88 and 90 are of the harmonic drive type, such as described in U.S. Pat. No. 4,833,941 to Leppanen et al. Other types of actuators would work, the main criteria for actuators being a linear range of operation of approximately 2 mm at 0.001 mm resolution, with no backlash. The first set of actuators 88 must be capable of providing enough force to move respective portions 110 of the restrictor bar 36 in the restrictor bar slot 32 whereas the second set of actuators 90 must be capable of providing enough force to deflect the cross-directional die lip portions 86. It will be apparent that the force required to deflect the cross-directional die lip portions 86 may be different than the force required to move the restrictor bar 36 in the restrictor bar slot 32 and therefore the actuators 91 of the first and second sets 88 and 90 need not be the same.

Each actuator of the first and second sets of actuators also has a linear transducer 141 which acts as position feedback means for providing an indication of the position of the actuator.

Apparatus for controlling mass flow

Figure 3A:
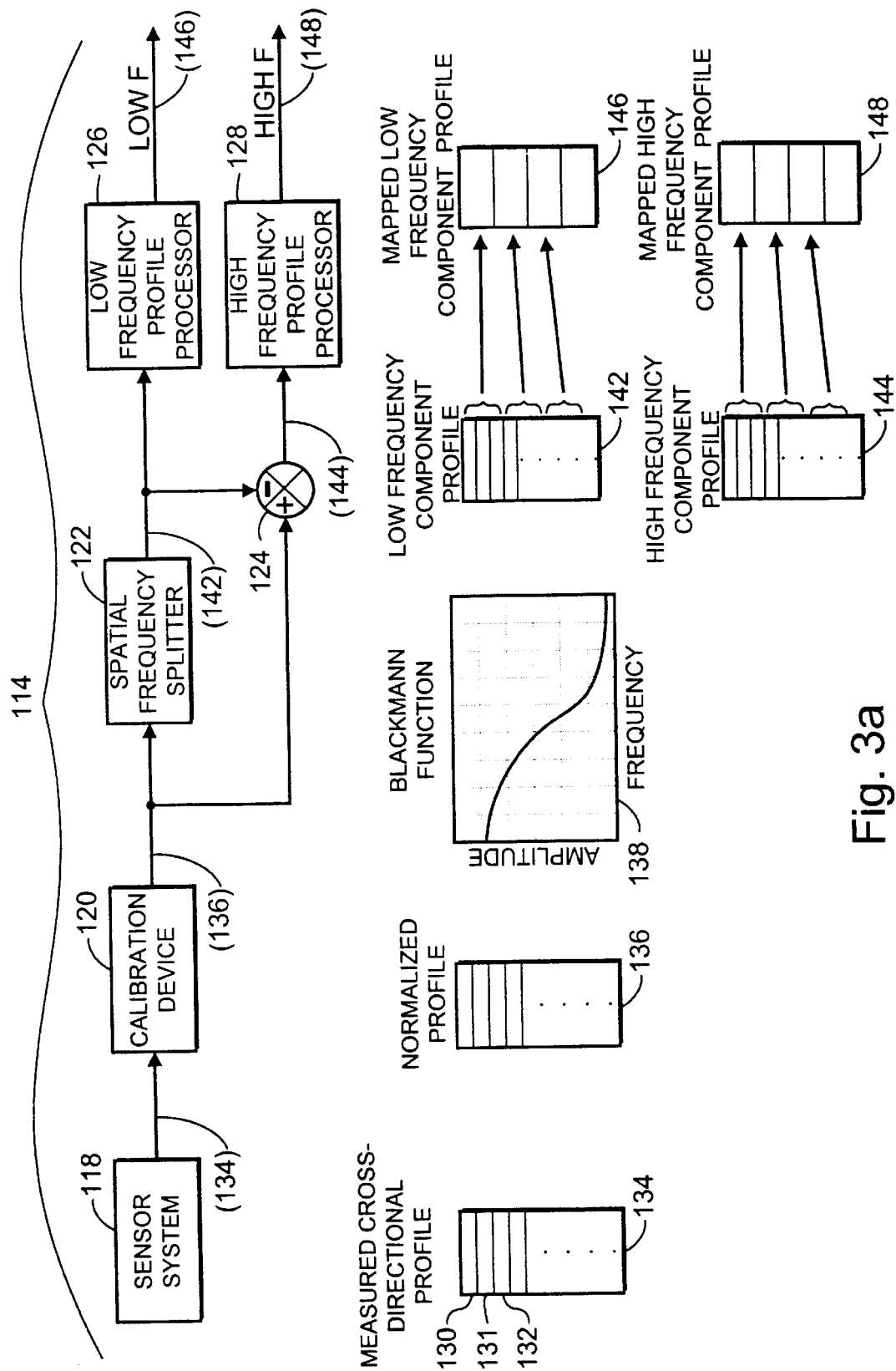
FIG. 3a is a block diagram of a cross-directional control system for producing mapped low and high frequency component profiles, according to the first embodiment of the invention.
Figure 3B:
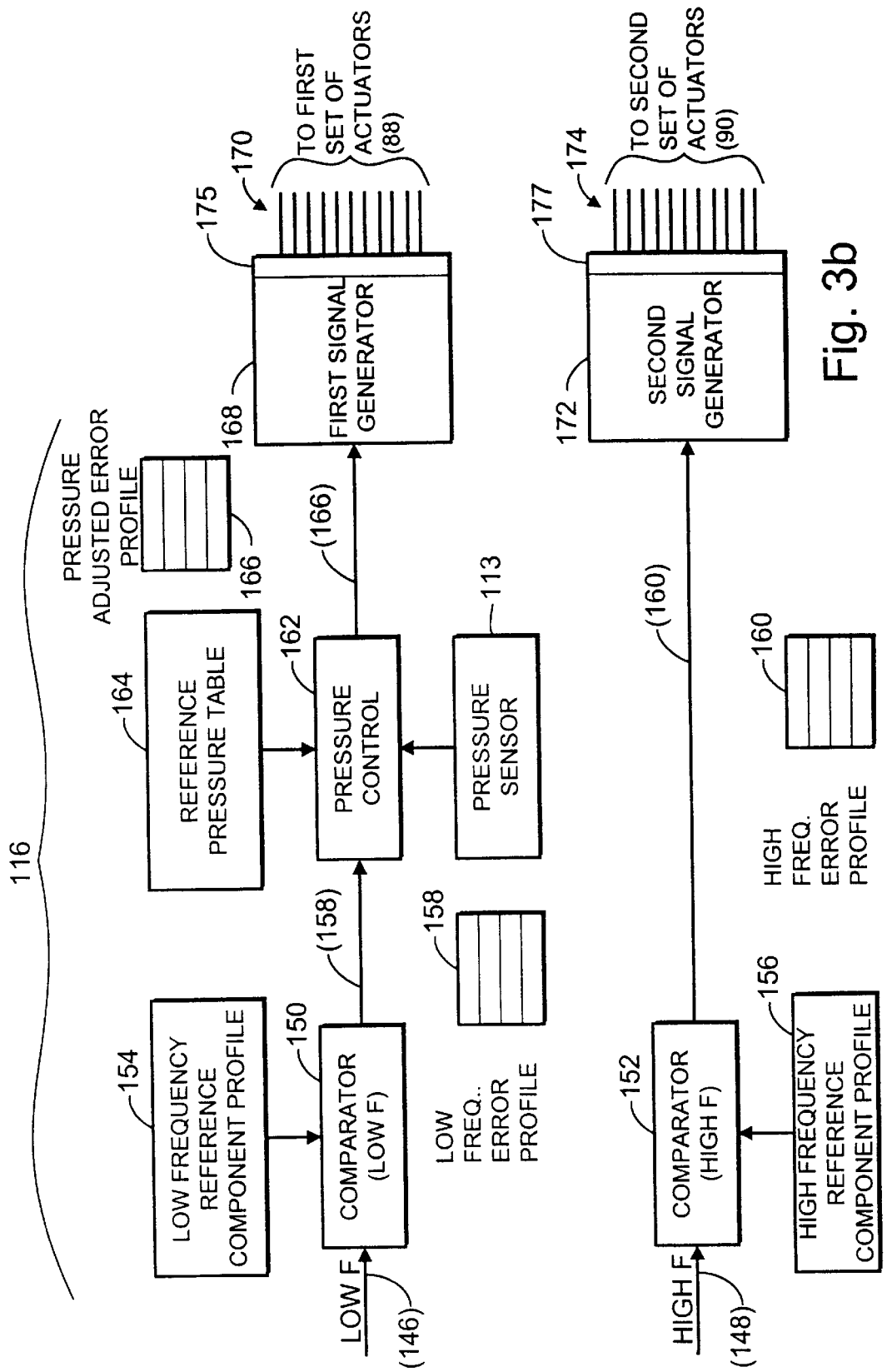
FIG. 3b is a block diagram of an actuator interface for producing signals for operating first and second sets of actuators in response to the mapped low and high frequency component profiles produced by the cross-directional control system shown in FIG. 3a, according to the first embodiment of the invention.

Referring to FIGS. 3a and 3b, the apparatus 13 for controlling mass flow in the extrusion die includes a programmable controller having a plurality of modules represented in FIGS. 3a and 3b by functional blocks. It will be appreciated that generally the functional blocks depicted herein are implemented by suitably programming a conventional programmable controller to perform the functions described in connection with respective functional blocks. Generally the functional blocks implement a cross-directional control portion 114 of the type described in FIG. 10 of U.S. Pat. No. 4,965,736 to Balakrishnan and an actuator interface portion 116 for employing signals produced by the cross-directional control portion 114 to control the first and second sets of actuators 88 and 90 shown in FIG. 1.

The cross-directional control portion 114 includes a sensor module 118, a calibration module 120, a spatial frequency splitter module 122, a summer module 124 and low and high frequency profile processor modules 126 and 128.

Sensor System

Referring back to FIG. 1, the sensor module 118 measures extrusion thickness or weight at a plurality of consecutive cross-directional positions 130, 131, 132, etc., along the extrusion 26. Referring back to FIG. 3, the sensor module produces a list 134 of numbers representing thickness or weight or at least one property of the extrusion at consecutive corresponding cross-directional positions. The positions of the numbers in the list represent the corresponding cross-directional positions 130, 131, 132 at which the corresponding measurement was taken. The list is referred to as the measured cross-directional profile of the extrusion. The sensor module 118 may produce thousands of thickness or weight values in each scan. The sensor system thus acts as measurement means for providing cross-directional measurements of at least one property of an extrusion produced by the extrusion die, such measurements being made at a plurality of cross-directional locations that successively span the extrusion 26. The sensor system further acts as means for assembling the measurements to provide measured cross-directional profiles of the extrusion, the cross-directional profiles being represented as lists of numbers. Each scan produces a new cross-directional profile.

Calibration module

The calibration module 120 receives the list of numbers 134 from the sensor module 118 and normalizes the numbers in the list to produce a normalized profile 136, for use by the spatial frequency splitter module 122. The normalized profile is a list of normalized numbers representing the cross-directional measured profile.

Spatial frequency splitter

The spatial frequency splitter module 122 functions to decompose the calibrated profile measurements represented by the normalized profile 136 into low spatial frequency and high spatial frequency components. This is accomplished using smoothing or convolution techniques. Smoothing can be performed by computing the running arithmetical average of the normalized list 136.

Convolution can be performed by convolving the normalized profile 136 with a low-pass window function such as the Blackman function 138 to produce a convolved profile in which high spatial frequency components are attenuated and low spatial frequency components are substantially unaltered. The Blackman function is suitable for this purpose as it has a generally constant amplitude over a range of low frequencies and rapidly decreases to zero at a pre-selected cutoff spatial frequency. The cutoff frequency may be defined by a tuning factor which is inversely related to the cutoff frequency. Accordingly, for a selected tuning factor, the spatial frequency splitter operates to attenuate spatial frequency components having periods shorter than the tuning factor and generally does not alter spatial frequency components having periods longer than the tuning factor.

The spatial frequency splitting means represents the spatial frequency components as low and high frequency component profiles respectively, the low and high frequency profiles each including a respective list of numbers representing amplitudes of the spatial frequency components at respective cross-directional locations along the cross-directional profile.

As the sensor system produces thousands of thicknesses or weight values in each scan, there are more cross-directional positions than there are actuators. Furthermore, as stated above, there are more actuators in the second set 90 of actuators than there are in the first set 88. Hence, it is desirable to "map" cross-directional measurements into mapping zones associated with respective actuators, with a single representative measurement being produced to represent the cross-directional measurements within respective zones. Each mapping zone is considered to extend one half of the distance between actuators on each side of the actuator. Therefore, for the first set of actuators, which are on 6 inch centres, the zone width for each actuator is 6 inches or 3 inches on each side of each actuator. It should be noted that the zone width mentioned here is different from the zone of influence mentioned above. The zone width mentioned here is simply based on the width between actuators whereas the zone of influence is the distance over which a given actuator is operable to affect mass flow.

Referring to FIG. 1, the tuning factor is selected based upon the cross-directional response of the actuators of the first and second sets of actuators 88 and 90. It is preferable to select a tuning factor corresponding to a wavelength no less than twice the width of the actuator mapping zones. Of the two sets of actuators, the first set 88 has the longest distance 92 between actuators (6 inches) and therefore the longest actuator zones. The tuning factor is preferably selected based on the largest actuator zones of the system and, in the embodiment shown, as the spacing between adjacent actuators of the first set is 6 inches, the tuning factor is preferably set at no less than 12 (2×6) inches per cycle.

Referring back to FIG. 3, the spatial frequency splitter will thus produce a low frequency component profile 142 which is a list of numbers resulting from the convolution of numbers representing the Blackman function 138 and the numbers representing the normalized profile 136.

The low frequency component profile 142 is then supplied to the low frequency profile processor 126 and at the same time is supplied to the summer module 124 which subtracts individual numbers of the low frequency component profile 142 from corresponding numbers of the normalized profile 136 to produce a high frequency component profile 144 which is another list of numbers. The low frequency component profile 142 therefore represents a low spatial frequency component of the measured profile and the high frequency component profile 144 represents a high spatial frequency component of the measured profile. The spatial frequency splitter thus acts as spatial-frequency splitting means for operating upon the cross-directional profile measurements to separate selected spatial frequency components from each cross-directional profile, the spatial frequency components including low and high frequency components.

High and low frequency profile processors

The low and high frequency component profiles 142 and 144 are then provided to respective low and high frequency profile processor modules 126 and 128 which undertake the mapping of the profiles as mentioned earlier. Mapping is done by performing an arithmetical averaging function on the numbers of the profiles corresponding to samples associated with cross-directional locations which are within respective actuator mapping zones. The low and high frequency profile processor modules 126 and 128 thus produce respective low and high frequency mapped lists of numbers 146 and 148 representing the averages of numbers in the low and high frequency component profiles representing samples within respective actuator zones. Thus, the lists of numbers produced by the low and high frequency profile processor modules 126 and 128 have the same number of entries as the numbers of actuators of the first and second sets of actuators (88 and 90) respectively. In the present embodiment, the low frequency mapped profile 146 is ultimately used to control the first set of actuators 88 while the high frequency mapped profile 148 is ultimately used to control the second set of actuators 90. The profile processor modules 126 and 128 thus act as mapping means for producing low and high frequency mapped profiles 146 and 148 representing low and high frequency mapped profiles respectively, mapped according to a desired function, to correspond to respective sets of actuators. In this embodiment, the desired function is an averaging function.

High and low frequency comparators

Referring to FIG. 3b, the mapped low and high frequency profiles 146 and 148 are provided to low and high frequency component comparators 150 and 152. At the same time, a low frequency reference profile 154 representing a desired low frequency component profile and a high frequency reference profile 156 representing a desired high frequency component profile are provided to the low and high frequency comparators 150 and 152, respectively. Reference spatial frequency components are thus represented by low and high frequency reference profiles having the same number of positions as the low and high frequency mapped profiles.

The low and high frequency component comparators 150 and 152 compare numbers in successive locations in the low and high frequency mapped profiles 146 and 148 with numbers in corresponding positions in the low and high frequency reference profiles 154 and 156 to produce low and high frequency error profiles 158 and 160 consisting of respective lists of numbers representing the differences between numbers compared.

The low frequency error profile 158 is presented to a pressure control module 162 which is in communication with a reference pressure table module 164 and the pressure sensor 113. The pressure control module 162 is operable to increase or decrease the numbers in the list of numbers in the low frequency error profile 158 to produce a pressure-adjusted error profile 166. The pressure adjusted error profile 166 is provided to a first signal generator 168 which produces individual error signals on a first set of respective signal lines 170 for controlling respective actuators of the first set of actuators (88) to vary the interference presented to the molten mass provided by the restrictor bar 36 to cause the restrictor bar to be set to a desired degree of interference to produce a desired pressure in the manifold portion 22. Thus, pressure adjusted error signals are sent to the individual actuators of the first set in response to variations in profile measurement or pressure measurement. Each individual pressure-adjusted error signal received by an actuator defines an amount of linear extension of its corresponding actuator causing the actuator to move its respective spindle linearly in response, causing a corresponding movement in respective cross-directional portions of the restrictor bar.

The high frequency comparator 152 presents the high frequency error profile 160 to a second signal generator 172 which produces individual error signals on a second set of respective signal lines 174 for controlling respective actuators of the second set of actuators (90) to vary the positions of respective cross-directional portions of the die lip.

Generally, the comparators act as comparing means compares numbers in successive locations in the low and high frequency mapped profiles with numbers in corresponding positions in the low and high frequency reference profiles to produce low and high frequency error profiles representing the differences between corresponding numbers in the low frequency component profiles and the low frequency reference profile and the difference between corresponding numbers in the high frequency component profile and the high frequency reference profile, the error signal components being derived from the high and low frequency error profiles. In addition, the low frequency error profile is adjusted according to the measured pressure in the die to produce the pressure adjusted error profile from which the low frequency error signals are derived.

The first and second signal generators have position feedback signal receivers 175, 177 for receiving feedback position signals from the linear transducers 141 on the actuators so that the actuators can be accurately positioned in response to the error signals. The feedback signal generators 175, 177 also facilitate initialization of the actuators for automatically setting each of the actuators of the first and second sets of actuators into an initialization position defined by the high and low frequency reference component profiles and the reference pressure table value corresponding to the type of material to be extruded.

Operation

Referring to FIGS. 3a and 3b, before drawing an extrusion, it will be appreciated that the sensor module 118 detects that an extrusion is not in progress, hence no measured profile is produced and hence the low and high frequency profiles 158 and 160 are zero.

Before a molten mass of material is introduced into the channel 20 the apparatus is first taken through an initialization procedure in which the operator identifies the type of material to be extruded, from a list of materials, the list being stored in the reference pressure table 164. Upon the selection of a material type, the pressure control module 162 produces the pressure adjusted error profile 166 which is received by the first signal generator 168 which issues signals 170 to the individual actuators of the first set of actuators 88 to cause them to move the restrictor bar 36 into an initial position of interference within the manifold portion 22. In this operation, all actuators of the first set of actuators 88 are actuated in a global fashion such that each cross-directional portion of the restrictor bar 36 is extended into the manifold portion by the same amount. This initial positioning of the restrictor bar pre-determines the pressure of the molten mass 24 in the manifold portion 22 when the molten mass 24 is ultimately introduced into the die block 14.

Next, the user may select the desired profile parameters of the extrusion, from which the low and high frequency reference component profiles are selected from a pre-stored list of such profiles for a plurality of various extrusions. Upon selecting such profile parameters, the low and high frequency comparators 150 and 152 produce low and high frequency error profiles 158 and 160 respectively. The low frequency profile 158 is provided to the pressure control module 162 which may further adjust the pressure adjusted error profile 166 to cause the first signal generator 168 to produce signals on signal lines 170 for further adjustment of the restrictor bar to pre-select the die pressure for the desired profile of the material selected.

In addition, the high frequency comparator 152 produces the high frequency error profile 160 which causes the second signal generator 172 to produce the second set of signals on signal lines 174 to control the second set of actuators 90 to pre-set the die lip 64 to cause the initial portion of the extrusion to have the desired profile.

While the first and second signal generators 168 and 172 issue signals to the first and second sets of actuators 88 and 90, the linear transducers 141 on each actuator provide linear position feedback signals to the position feedback signal receivers 175, 177 to indicate to the first and second signal generators when the desired initial position has been attained.

Having set the restrictor bar 36 and die lip portions 86 to the required initial position for the type of material selected and the desired extrusion dimensions, the die is ready to receive the molten mass 24 of extrusion material.

Upon receiving the molten mass of extrusion material in the channel 20, the molten mass enters the manifold portion 22, where the restrictor bar 36 restricts the flow of material and creates a pressure in the molten mass.

Generally, during the extrusion process, the sensor module 118 measures a parameter of the extrusion, such as thickness. The sensor system 118 produces the measured cross-directional profile 134 which is normalized by the calibration module 120 to produce the normalized profile 136.

The normalized profile 136 is provided to the spatial frequency splitter module 122 and to the summer module 124. The spatial frequency splitter convolves the normalized profile with a Blackman function 138 to produce the low frequency component profile. This low frequency component profile is provided to both the summer and to the low frequency profile processor 126. The summer subtracts the low frequency component profile from the normalized profile to produce a high frequency component profile.

The low and high frequency component profiles are provided to the low and high frequency profile processors which map the respective profiles to produce the low and high frequency mapped profiles.

The low and high frequency mapped profiles are provided to the low and high frequency comparators which compare them with low and high frequency reference component profiles respectively to produce low and high frequency error profiles respectively.

The low frequency error profile 158 is provided to the pressure control module 162 which augments or diminishes all values in the low frequency error profile 158 to produce the pressure adjusted error profile 166. The pressure control module 162 thus increases or decreases numbers in the low frequency error profile 158 to produce the pressure adjusted error profile 166. This pressure adjusted error profile 166 is passed to the first signal generator 168 which produces error signals to control respective actuators of the first set 88 of actuators connected to the restrictor bar (36).

Referring to FIGS. 1 and 2, the pressure of the molten mass 24 is measured in the manifold, by the pressure sensor 113. Referring back to FIG. 3*b*, the pressure control module 162 continuously monitors the pressure measurements of the pressure sensor 113 and constantly compares such measurements with values stored in the pressure reference table 164. When the measured pressure exceeds a reference pressure value, the pressure control module 162 simultaneously increases all values of the low frequency error profile 158 to restrict the flow of molten mass 24 to the die lip portions 86. Conversely, where the measured pressure is less than the reference pressure, the pressure control module simultaneously decreases all values of the low frequency error profile 158 to decrease the interference to flow presented by the restrictor bar 36, thereby increasing the flow of molten mass 24 to the cross-directional die lip portions 86. Thus, the restrictor bar 36 is globally extended or retracted into the manifold 22 to maintain the pressure of molten mass 24 within a desired range. By keeping the pressure of the molten mass 24 within such a range, the consistency of the extrusion is accurately controlled.

The high frequency error profile 224 is passed to the second signal generator 172 which produces error signals on signal lines 174 to control the second set of actuators to adjust the cross-directional die lip portions in order to minimize any differences between the high frequency component profile and the high frequency reference profile.

The first and second sets of actuators thus control mass flow components of the extrusion die in response to the error signals, the first set of actuators being controlled by the low frequency error signals and the second set of actuators being controlled by the high frequency error signals. More particularly, the restrictor bar 36 is thus controlled in response to pressure measurements in the manifold portion and in response to the low frequency spatial component of the measured profile and the cross-directional die lip portions are controlled in response to the high frequency spatial component of the measured profile.

Generally, the comparators, reference profiles and signal generators act as error signal generating means for generating error signals representing the differences between the spatial frequency component profiles and the reference spatial frequency profiles.

It will be appreciated that with conventional programmable controllers, once the type of material and extrusion parameters have been selected, the functional blocks shown in FIGS. 3*a* and 3*b* direct the programmable controller to actuate the actuators accordingly to maintain the die pressure and extrusion profile within a desired range. It will be appreciated that movements of the restrictor bar and die lip portions occur nearly instantaneously, in which case the die may be "set up" and ready to extrude any polymeric material within seconds. Therefore, set up time of the die is reduced to near zero, allowing for fast die changes between uses of the die for different materials. In addition, profile variances in the extrusion can be detected and corrected nearly instantaneously.

In general, a method performed by the apparatus includes the steps of:

a) providing cross-directional measurements of at least one property of an extrusion produced by said extrusion die, such measurements being made at a plurality of cross-directional locations that successively span the extrusion;

b) assembling the measurements to provide cross-directional profiles of the extrusion;

c) operating upon the cross directional profiles to separate selected spatial frequency component profiles from each cross-directional profile;

d) providing reference profiles representing desired spatial frequency profiles;

e) for generating error signals representing the difference between said spatial frequency component profiles and said desired spatial frequency profiles; and f) controlling mass flow components of said extrusion die in response to said error signals to minimize the differences between said spatial frequency component profiles and said reference profiles.

Second Embodiment

Figure 4A:
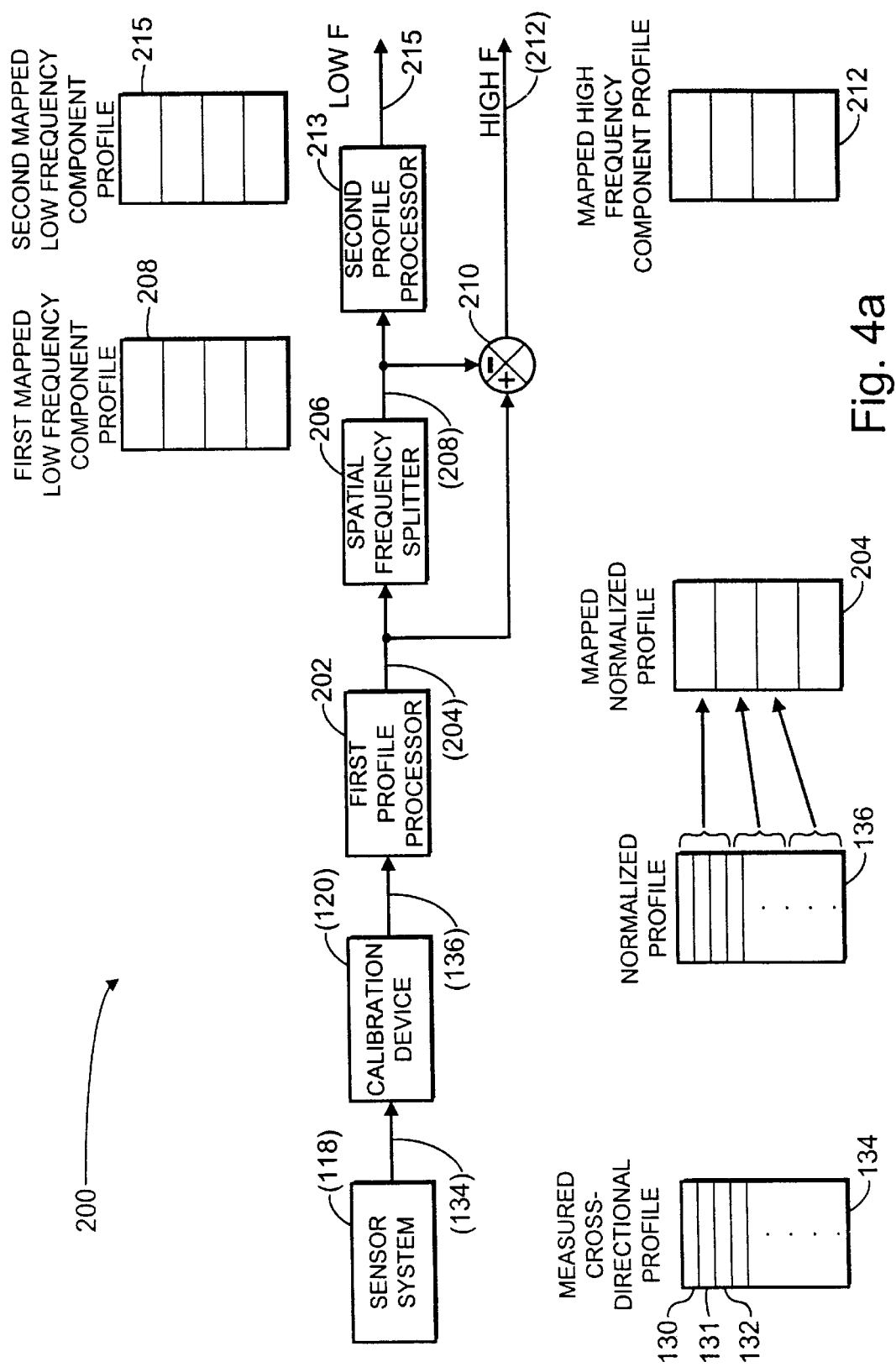
FIG. 4a is a block diagram of a cross-directional control system for producing mapped low and high frequency component profiles, according to a second embodiment of the invention.
Figure 4B:
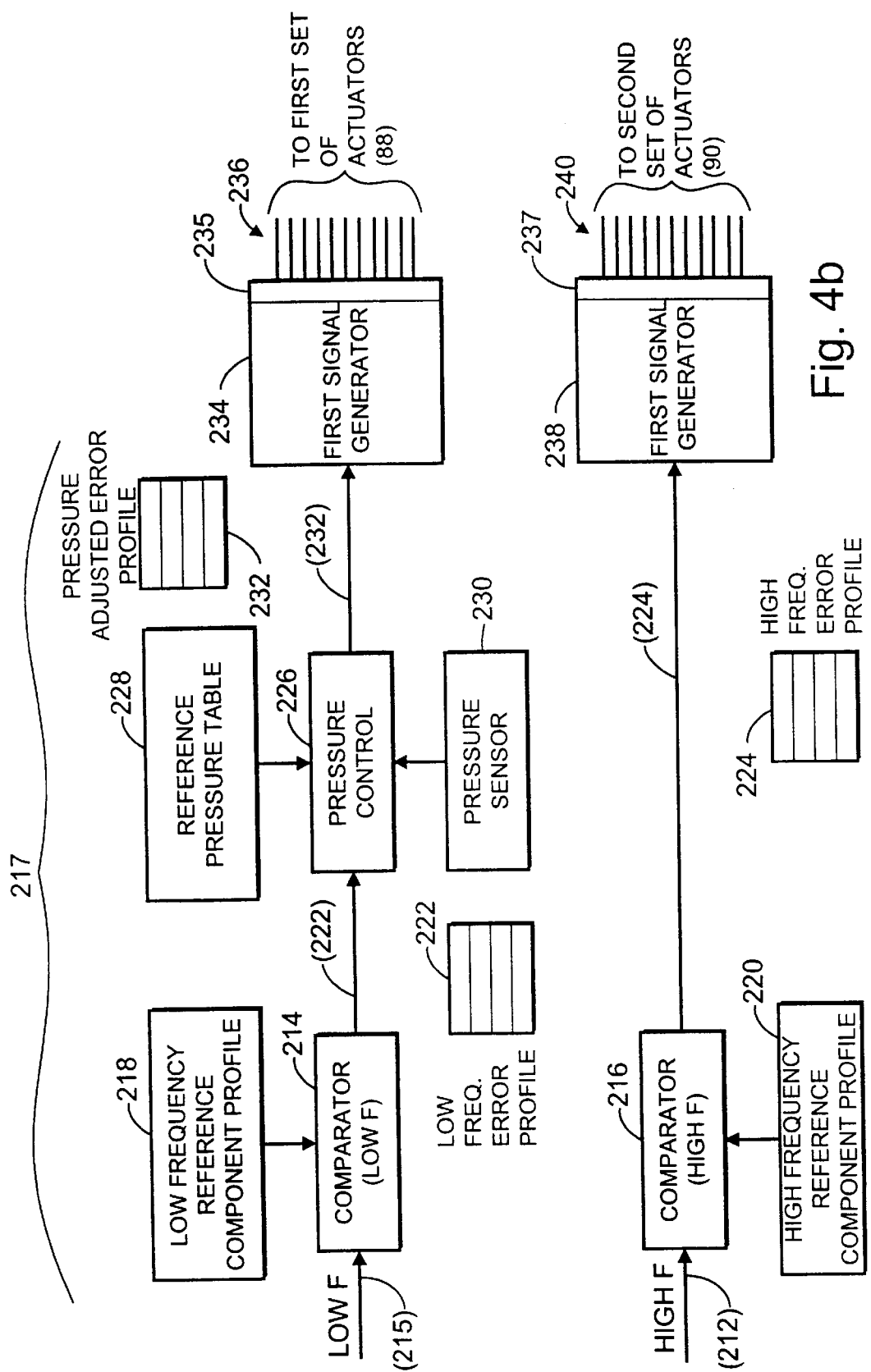
FIG. 4b is a block diagram of an actuator interface for producing signals for operating first and second sets of actuators in response to the mapped low and high frequency component profiles produced by the cross-directional control system shown in FIG. 4a, according to the second embodiment of the invention.

An apparatus according to a second embodiment of the invention includes the same die apparatus as shown in FIGS. 1 and 2 but includes a different control configuration as shown generally at 200 in FIGS. 4*a* and 4*b*. The control configuration includes the same sensor module 118 and calibration module 120 as in the first embodiment and these two modules produce measured cross directional profiles 134 and normalized profiles 136 in the same manner as described in connection with the first embodiment. The control configuration, however, has a different profile processor 202 which produces a mapped normalized profile 204 consisting essentially of a list of numbers in which the number of entries in the list is the same as the number of actuators in the second set of actuators and therefore the entries in the normalized cross-directional profile are mapped to specific positions in the mapped normalized profile 204 according to their location with respect to the actuator zones of the second set of actuators. The term actuator zone is as described in connection with the first embodiment. In this embodiment therefore, the sensor module 118, calibrator module 120 and the first profile processor act as measurement means for providing cross-directional measurements of at least one property of an extrusion produced by said extrusion die, such measurements being made at a plurality of cross-directional locations that successively span the extrusion and means for assembling the measurements to provide cross-directional profiles of the extrusion.

In this embodiment, the actuators of the second set of actuators are on 3-inch centres and therefore each actuator has a zone of 3-inches, or 1.5 inches on each side of its centreline. The numbers of the normalized profile 136 which correspond to measurements taken within a given actuator zone are averaged to produce a single number representing the average value of normalized measurements within this actuator zone. Thus, effectively, the mapped normalized profile has the same number of entries as the number of actuators in the second set 90 of actuators, and the resolution of the mapped normalized profile is therefore determined by the number of actuators in the second set of actuators 90.

The mapped normalized profile 204 is provided to a spatial frequency splitter 206 which functions the same as the spatial frequency splitter described in connection with the first embodiment to produce a first mapped low frequency component profile 208. As with the first embodiment, the tuning factor is based on the spacing of the first set of actuators because they are spaced apart further than the second set of actuators or in other words are the actuators of the system which are spaced apart by the greatest distance. The first mapped low frequency component profile 208 has the same number of entries as the number of entries in the mapped normalized profile 136, i.e. the number of actuators of the second set of actuators. The first mapped low frequency component profile is provided to a second profile processor 213 which maps the first mapped low frequency component profile 208 into a second mapped low frequency component profile 215 having the same number of entries as there are actuators in the first set of actuators. Again the mapping is done according to an averaging function as described in connection with the first embodiment.

The first mapped low frequency component profile 208 is also subtracted by a summer 210 which subtracts each entry in the mapped low frequency component profile 208 from its corresponding entry in the mapped normalized profile 204 to produce a mapped high frequency component profile 212. The second mapped low frequency component profile 215 and the high frequency component profile are presented to an actuator interface portion 217 shown in FIG. 4*b*, similar to the actuator interface shown in FIG. 3*b*.

Referring to FIG. 4*b*, the second mapped low frequency component profile 215 and the high frequency component profile 212 are provided to low and high frequency component comparators 214 and 216, respectively. At the same time, a low frequency reference profile 218 representing a desired low frequency component profile and a high frequency reference profile 220 representing a desired high frequency component profile are provided to the low and high frequency comparators 214 and 216, respectively. Reference spatial frequency components are thus represented by low and high frequency reference profiles having the same number of positions as the second mapped low frequency component profile 215 and high frequency mapped profile 212, respectively.

The low and high frequency component comparators 214 and 216 compare numbers in successive locations in the second mapped low frequency profile 215 and the mapped high frequency component profile 212 with numbers in corresponding positions in the low and high frequency reference profiles 218 and 220 to produce low and high frequency error profiles 222 and 224 consisting of respective lists of numbers representing the differences between numbers compared.

The low frequency error profile 222 is presented to a pressure control module 226 which is in communication with a reference pressure table module 228 and the pressure sensor 230. The pressure control module 226 is operable to increase or decrease the numbers in the list of numbers in the low frequency error profile 222 to produce a pressure-adjusted error profile 232.

There is a first signal generator 234 which produces individual error signals on a first set of respective signal lines 236, in response to the pressure adjusted error profile 232, for controlling respective actuators of the first set of actuators 88 to vary the interference presented to the molten mass provided by the restrictor bar 36. In addition, the pressure control module 226 is operable to increase or decrease the numbers in the low frequency error profile 222 to cause the first signal generator 234 to cause the restrictor bar 36 to be set to a desired degree of interference to produce a desired pressure in the molten mass 24. Thus, pressure adjusted error signals are sent to the individual actuators of the first set (88) of actuators, in response to variations in profile measurement or pressure measurement. Each individual pressure-adjusted error signal defines an amount of linear extension of its corresponding actuator causing that actuator to move its respective spindle linearly in response, causing a corresponding movement in respective cross-directional portions of the restrictor bar 36.

The high frequency comparator 216 presents the high frequency error profile 224 to a second signal generator 238 which produces individual error signals on a second set of respective signal lines 240 for controlling respective actuators of the second set of actuators (90) to vary the positions of respective cross-directional portions of the die lip.

The first and second signal generators 234 and 238 have first and second feedback signal receivers 235, 237 for receiving feedback position signals from the linear position transducers 141 on the actuators so that the actuators can be accurately positioned in response to the error signals and to facilitate accurate initialization of the actuators.

It will be appreciated that the apparatus according to the second embodiment is similar to the apparatus according to the first embodiment with the exception that the cross directional control systems are different and the number of entries in the mapped low and high frequency component profiles of the second embodiment have the same number of entries as determined by the number of actuators in the second set of actuators 90, whereas in the first embodiment, the low and high frequency component profiles have respective numbers of entries equal to the number of actuators in the first and second sets of actuators respectively.

The apparatus according to the first embodiment is best suited for applications where there is a vast difference in the number of actuators in the first and second sets of actuator whereas the apparatus according to the second embodiment is best suited for applications where the number of actuators in the first set is approximately the same as the number of actuators in the second set.

Alternatives

Alternatively to measuring the pressure of the molten mass before the restrictor bar, it would also be possible to measure the pressure just after the restrictor bar or to measure pressure both before and after the restrictor bar and calculate the pressure differential created by the restrictor bar and use the pressure differential at the pressure control module 226 for comparison with pressure differential values which would be stored in the pressure reference table.

While specific embodiments of the invention have been described and illustrated, such embodiments should be considered illustrative of the invention only and not as limiting the invention as construed in accordance with the accompanying claims.

What is claimed is:

1. An apparatus for controlling the mass flow of a mass in an extrusion die, the apparatus comprising:
    a) measurement means for providing cross-directional measurements of at least one property of an extrusion produced by said extrusion die, such measurements being made at a plurality of cross-directional locations that successively span the extrusion;
    b) means for assembling the measurements to provide cross-directional profiles of the extrusion;
    c) spatial-frequency splitting means for operating upon the cross directional profiles to separate selected spatial frequency component profiles from each cross-directional profile into measured high frequency component profiles and measured low frequency component profiles;
    d) reference profile means for providing reference profiles representing desired high frequency component profiles and low frequency component profiles;
    e) error signal generating means for generating error signals representing the difference between said measured high frequency component profiles and measured low frequency component profiles and said desired high frequency component profiles and low frequency component profiles to produce high and low frequency error profiles;
    f) first set of actuators disposed generally linearly in a first cross directional line parallel to said extrusion die connected to a flexible restrictor bar extending in said first cross-directional line for controlling mass flow in the extrusion die, said flexible restrictor bar having a plurality of cross-directional portions with said first set of actuators being connected to respective cross-directional portions of said flexible restrictor bar such that each of said first set of actuators is operable to move a corresponding cross-directional portion of said restrictor bar, the first set of actuators being controlled by the error signals representing the low frequency error profiles; and
    g) second set of actuators disposed generally linearly in a second cross-directional line, downstream and parallel to the first cross-directional line, connected to a flexible die lip extending in said second cross-directional line for controlling mass flow in the extrusion die, said flexible die lip having a plurality of cross-directional portions with said second set of actuators being connected to respective cross-directional portions of said flexible die lip such that each of said second set of actuators is operable to move a corresponding cross-directional portion of said flexible die lip, the second set of actuators being controlled by error signals representing the high frequency error profiles.

2. An apparatus as claimed in claim 1 wherein said first set of actuators is disposed generally linearly in said first cross-directional line, with each of said first set of actuators being spaced apart from an adjacent actuator by a first distance and wherein said second set of actuators is disposed generally linearly in said second cross-directional line, and spaced apart from said first set of actuators, each of said second set of actuators being spaced apart from an adjacent actuator by a second distance.

3. An apparatus as claimed in claim 2 wherein said first distance is greater than said second distance.

4. An apparatus as claimed in claim 1 wherein said error signal generating means includes means for controlling pressure in said mass.

5. An apparatus as claimed in claim 4 wherein said means for controlling pressure includes:
    a) a pressure sensor operable to produce a measured pressure value representing the pressure of the mass within the die;
    b) means for providing a reference pressure value corresponding to the extrusion properties of the mass being extruded; and
    c) pressure comparison means for determining the difference between the measured pressure value and the reference pressure value and for globally increasing or decreasing at least one of said high and low frequency error profiles in response to said difference to produce a pressure adjusted error profile.

6. An apparatus as claimed in claim 5 wherein said error signal generating means includes first and second signal generators for producing said high and low frequency error signals in response to said pressure adjusted error profile and at least one of said high and low frequency error profiles.

7. An apparatus as claimed in claim 6 wherein said pressure comparison means increases or decreases said low frequency error profile.

8. An apparatus as claimed in claim 7 wherein each actuator of said first and second sets of actuators has position feedback means for providing an indication of the position of said actuator.

9. An apparatus as claimed in claim 8 wherein said first and second signal generators have initialization means for automatically setting each of said actuators of said first and second sets of actuators into an initialization position defined by the desired high and low frequency component profiles and the reference pressure value corresponding to the type of material to be extruded.

10. An apparatus as claimed in claim 9 wherein said low and high frequency compone profiles each include a respective list of numbers representing amplitudes of said spatial frequency components at respective cross-directional locations along said first and second cross-directional lines.

11. An apparatus as claimed in claim 10 further including low and high frequency profile processors for producing low and high frequency mapped profiles as a function of at least one of said numbers of said low and high frequency components respectively.

12. An apparatus as claimed in claim 11 wherein each of said actuators has a respective zone in said first and second cross-directional lines and wherein said measurement means takes a plurality of measurements within each zone.

13. An apparatus as claimed in claim 12 wherein said function is an averaging function for averaging numbers representing said low and high frequency components associated with locations within a zone of a respective actuator.

14. An apparatus as claimed in claim 13 wherein said comparing, means compares numbers in successive locations in said low and high frequency mapped profiles with numbers in corresponding positions in said low and high, frequency reference profiles respectively to produce low and high frequency error profiles, the low and high frequency error profiles including lists of numbers representing the differences between corresponding numbers in the low frequency component profile and the low frequency reference profile and the differences between corresponding numbers in the high frequency component profile and the high frequency reference profile, said error signals being derived from said high and low frequency error profiles.

15. An apparatus as claimed in claim 1 further including means for controlling the pressure of said mass in said die.

16. An apparatus as claimed in claim 15 wherein said means for controlling pressure includes:
   a) a pressure sensor for producing a measured pressure value representing the pressure of the mass within the die;
   b) means for providing a reference pressure value corresponding to the extrusion properties of the mass being extruded; and
   c) means for determining the difference between the measured pressure value and the reference pressure value and for adjusting said error signals to actuate said actuators to maintain said pressure within a prespecified tolerance.

17. An apparatus as claimed in claim 16 wherein said means for providing a reference pressure value and said means for determining the difference between said measured pressure value and the reference pressure value includes a programmable controller.

18. An apparatus as claimed in claim 17 wherein at least some of said actuators have position transducers for providing signals representing the positions of said at least some actuators.

19. An apparatus as claimed in claim 18 further including means for automatically setting each of said actuators of said first and second sets of actuators into an initialization position defined by said reference profiles and said reference pressure value.

20. An apparatus as claimed in claim 1 wherein said means for assembling includes a first profile processor for producing a mapped high frequency component profile having the same number of entries as there are actuators in the second set of actuators, said error signal generator operating on said high frequency component profile.

21. An apparatus as claimed in claim 20 wherein said spacial frequency splitting means includes a second profile processor for mapping said mapped low frequency component profile into a second mapped low frequency profile having the same number of entries as there are actuators in the first set of actuators, said error signal generating means operating on said second mapped low frequency profile.

22. A method of controlling the mass flow of a mass in an extrusion die, the method comprising the steps of:
   a) providing cross-directional measurements of at least one property of an extrusion produced by said extrusion die, such measurements being made at a plurality of cross-directional locations that successively span the extrusion;
   b) assembling the measurements to provide cross-directional profiles of the extrusion;
   c) operating upon the cross directional profiles to separate selected spatial high and low frequency component profiles from each cross-directional profile;
   d) providing high and low frequency reference profiles representing desired spatial frequency profiles;
   e) generating high and low frequency error signals representing the difference between said spatial frequency component profiles and said desired spatial frequency profiles; and
   f) controlling mass flow components of said extrusion die in response to said error signals by controlling a first set of actuators connected to a restrictor bar with said low frequency error signals and controlling a second set of actuators connected to die lip portions with said high frequency error signals, thus minimizing the differences between said spatial frequency component profiles and said reference profiles.

23. A method as claimed in claim 22 further including the step of controlling pressure in said mass.

24. A method as claimed in claim 23 further including the steps of
   a) producing a measured pressure value representing the pressure of the mass within the die;
   b) providing a reference pressure value corresponding to the extrusion properties of the mass being extruded; and
   c) determining the difference between the measured pressure value and the reference pressure value and for globally increasing or decreasing at least one of said high and low frequency error profiles in response to said difference to produce a pressure adjusted error profile.

25. A method as claimed in claim 24 further including the step of producing said high and low frequency error signals in response to said pressure adjusted error profile and at least one of said high and low frequency error profiles.

26. A method as claimed in claim 25 further including the step of increasing or decreasing said low frequency error profile.

27. A method as claimed in claim 26 further including the step of providing an indication of the positions of said actuators.

28. A method as claimed in claim 27 further including the step of automatically setting each of said actuators of said first and second sets of actuators into an initialization position defined by the high and low frequency reference component profiles and the reference pressure table corresponding to the type of material to be extruded.

29. A method as claimed in claim 28 further including the step of producing low and high frequency mapped profiles as a function of at least one of said numbers of said low and high frequency components respectively.

* * * * *